United States Patent Office 3,383,023
Patented May 14, 1968

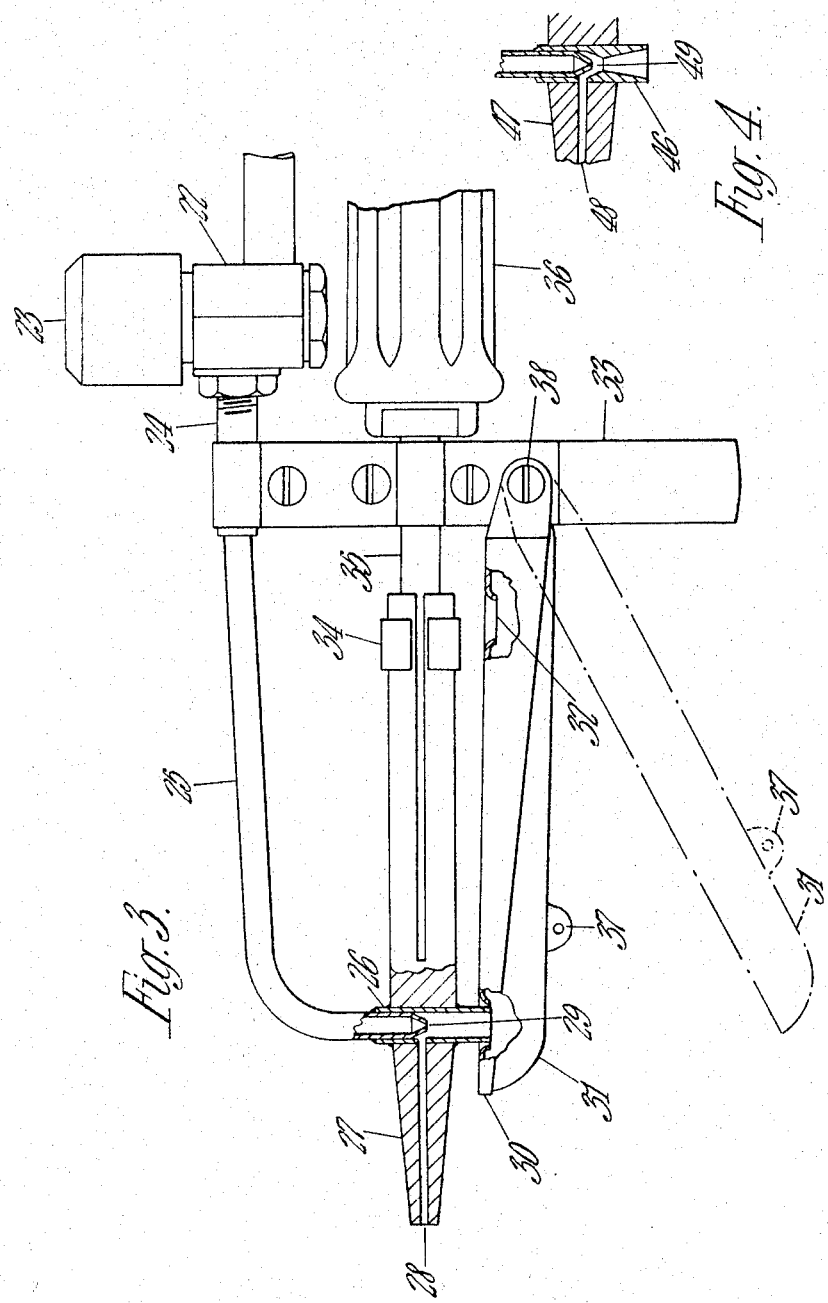

3,383,023
SOLDERING TOOLS AND ATTACHMENTS FOR SOLDERING IRONS
Sydney Brewster, Camberley, England, assignor to Anglo-Netherland Technical Exchange Limited, Croydon, Surrey, England, a British company
Filed July 29, 1965, Ser. No. 475,800
Claims priority, application Great Britain, Aug. 6, 1964, 32,111/64
5 Claims. (Cl. 228—20)

ABSTRACT OF THE DISCLOSURE

A tool for removing solder is provided with a component for melting the solder of a soldered junction, a duct having one end capable of being held in the molten solder and a passage adapted to receive a stream of gas. A restriction is located in the passage and the other end of the duct opens in the passage adjacent and downstream of the restriction where a suction is created in the duct by which the molten solder is drawn into the passage and blown therealong by the stream of gas.

This invention relates to improvements in and relating to tools for removing solder or soldering tools.

When a component has been soldered into a circuit, it is often required to separate it without damaging it. However, it is often found that although it is possible to melt the solder with a soldering iron it is sometimes difficult to withdraw the soldering iron, release it and then take hold of the component in order to remove it before the solder has solidified again; this difficulty is particularly acute where the soldered junction is located in a position having only difficult access and/or when the component is very delicate, for example, in electronics apparatus such as computers and transistor equipment.

An object of the invention is to reduce this difficulty and accordingly the invention is directed to a solder removing tool comprising means for melting the solder of a soldered junction, a duct capable of being dipped into the molten solder, a channel leading into a receptacle and having a restriction through which an air stream may be passed, the other end of the duct opening into the channel adjacent and downstream of the restriction to create a suction in the duct whereby the molten solder is sucked into the channel and blown into the receptacle by the air stream.

Obviously the tool would work if gases other than air were used.

Further objects and advantages of the invention will become more readily apparent to persons skilled in the art from the following detailed description and annexed drawings and in which drawings:

FIGURE 3 is a similar sectional view of a third example of the invention; and

FIGURE 4 is a part-sectional view of a further modification.

Figure 1:
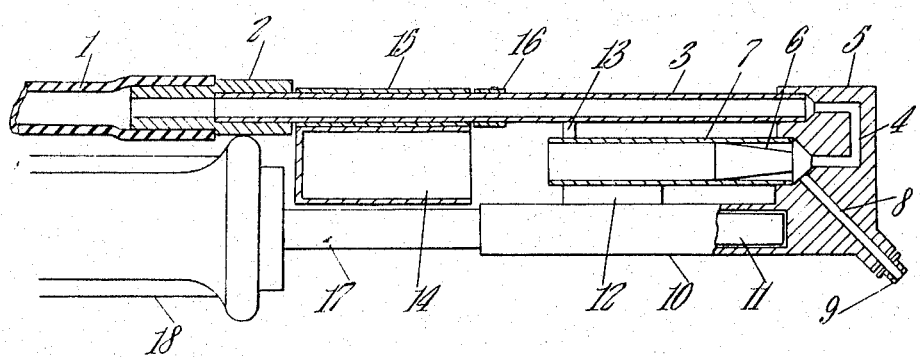
FIGURE 1 is a vertical medial sectional view of one example of the invention.

In FIGURE 1 there is disclosed a tool including a rubber or plastic pressure tube 1 connected to a rubber or plastic blow bulb (not shown) having an air inlet valve and which bulb can be manually squeezed to direct a stream of air along the tube 1. Alternatively, the tube may be connected to a pump. The tube terminates at an adaptor 2 made of material possessing a low thermal conductivity and a steel pressure tube 3 connects this adaptor with a duct 4 provided in a body member 5 which acts as a restriction for the air stream. The air escapes from this duct 4 into a gradually widening conically-shaped channel 6 and subsequently moves along a discharge pipe 7 which is wider than the duct 4 and consequently the air is at a lower pressure. A duct 8 extends from adjacent the narrow end of the channel 6 down to a working tip 9 of the soldering iron extending outward from the body member 5.

In this example the body member 5 is integrally formed with a copper bit 10 having a cavity 11 for housing a heating element and a copper heat conducting support 12 connects the bit 10 with the discharge pipe 7 to support the latter and ensure that it is maintained at the high temperature of the bit 10, body member 5 and working tip 9. A support 13 holds the pressure tube 3 above the discharge pipe 7 and a collector 14 is connected to a tube 15 supported on the pressure tube 3, and which tube 15 is prevented from sliding along the tube 3 by a stop 16. Alternatively, the collector may be a U-shaped spring metal plate clipped into place between the pressure tube 3 and a shaft 17 extending from the handle 18.

In operation, a stream of air is passed through the pressure tube 3 and the duct 4 into the narrow end of the widening channel 6. The stream of air moves along this channel 6 towards its widened end and in so doing lowers the pressure of the air stream to cause a suction effect at the narrower end of the channel 6, and which suction effect is transmitted along the duct 8 to the working tip 9. When the heating element of the soldering iron has heated the bit 10 and consequently the working tip 9, this tip is placed against the soldered junction to melt the solder and the air stream is introduced into the tube 1 so that a suction effect is produced at the tip 9. Thus the molten solder is sucked up the duct 8 while in its molten state and passes through the body member 5, along the conical channel 6 and pipe 7, all of which are maintained at a high temperature by the heating element of the soldering iron, to be discharged with the air stream into the collector 14 which is partially thermally insulated from the heating element so that the molten solder solidifies therein. The collector 14 can be removed, for example by rotating the tube 15 around the pressure tube 3, and emptied of the solder.

In another example (FIGURE 2) the tubes 1 and 3, body member 5, conical channel 6, discharge pipe 7, bit 10, collector 14 and support 12 are arranged differently and form an attachment capable of being easily fitted to the shaft 17 of a conventional soldering iron.

In this example, the pressure tube 3 is located below the bit 10 and the air stream passes from the tube 3 through a channel having a plug 19 and nozzle 20 and down a channel 21, preferably diverging in the shape of a cone. The duct 8 opens into the channel of the air stream slightly downstream from the nozzle 20 and thus molten solder is sucked up from the working tip 9, along duct 8 and joins the air stream to be ejected into the collector 14.

This example has the advantages that it can be dismantled easily since the collector 14 and pressure tube 3 may be simply screw connected to the bit 10. This easy dismantling enables the device to be cleaned easily and blockages can be easily removed since the whole flow path of the molten solder is rendered accessible. Furthermore, this example is cheaper and easier to make and it has a low thermal capacity and is, therefore easier and quicker to heat.

It will be appreciated that this soldering tool or attachment for a soldering iron has the advantage of employing a high air pressure which forms a reliable strong suction which produces more satisfactory results than a suction produced by low pressure techniques and which continually cleans the tool so that flux residues and dirt particles are less likely to block the tool.

A foot pump may be the source of air pressure or a compressed air line when circulated; in the former case it is only necessary to press the foot down to create ample pressure for operating the tool. The pipe may have two adaptors, one for air line connection and the other thread for fitting to a standard foot pump.

In FIGURE 3 the solder removing tool has a spring return air valve 22 controlled by a button 23 and connected to an air tube 25 which is hard soldered to a mixing tube 26 having a conically-converging tapering end part defining a pinhole 29 which acts as a nozzle for the air stream similar to the conically converging restriction provided by the duct 4 in FIGURE 1. A bit 27 contains a duct 28 opening into the mixing tube 26 adjacent and downstream of the pinhole 29. The mixing tube 26 leads directly through a cover 30 into a receptacle or solder catcher 31 which collects the molten solder which condenses into solid form. This receptacle 31 is hinged at 38 to a stand 33 for the tool which extends upwards to support the air tube 25. An exhaust hole 32 is swaged inwardly in the cover 30 to form a baffle to collect the loose particles of solder in the escaping air stream. The heating element is enclosed within a tube 35 to which the bit 27 is clamped by a clip 34. A lug 37 facilitates pivoting the receptacle 31 to the position shown in dotted lines for emptying the receptacle. The handle 36 of the tool is connected to the heating tube 35.

Figure 2:
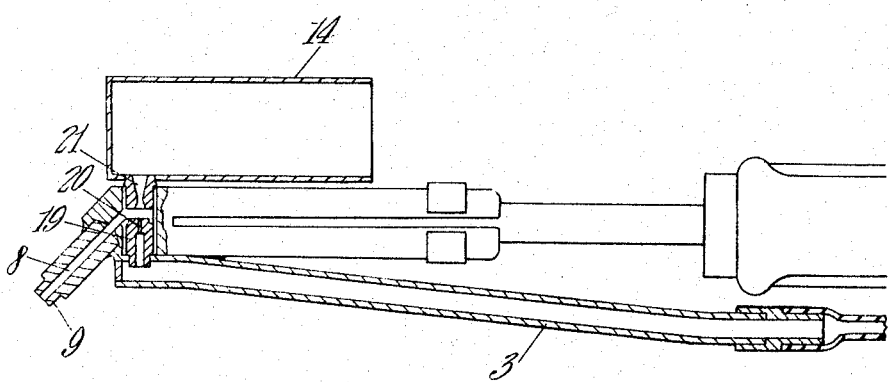
FIGURE 2 is a similar sectional view of a second example of the invention.

In FIGURE 4 a further double conical nozzle is provided providing a similar effect to that of the channel 21 in FIGURE 2.

It will be appreciated that in these tools the direct full force of the air stream is employed in blowing the solder to the receptacle which reduces the chance that cooling solder will become lodged in the channel leading to the receptacle.

This invention is not to be confined to any strict conformity to the showings in the drawings but changes or modifications may be made therein so long as such changes or modifications mark no material departure from the spirit and scope of the appended claims.

I claim:

1. A solder removing tool comprising means for melting the solder of a soldered junction, means defining a duct having one end capable of being held in the molten solder, means defining a passage capable of receiving a stream of gas and having a restriction through which the stream of gas is passed, the other end of the duct opening into the passage adjacent and downstream of the restriction where a suction is created in the duct by which the molten solder is sucked into the passage and blown therealong by the stream of gas.

2. The tool as claimed in claim 1 wherein the means for melting the solder includes an electrical heating means adapted to heat a working bit capable of being heated and having a working tip adapted to transmit heat to the soldered junctions with said bit containing said duct and that portion of said passage provided with said restriction.

3. The tool as claimed in claim 1 wherein the restriction has a conically converging surface leading to an aperture.

4. The tool as claimed in claim 1 wherein the restriction has a conically converging surface leading through an aperture to a conically diverging surface, with the duct opening into this diverging surface.

5. An attachment for a soldering tool including means defining a duct having one end capable of being held in the solder of a soldered junction rendered molten by heat transmitted by the attachment, means defining a passage capable of receiving a stream of gas and having a restriction through which the gas stream is passed, the other end of the duct opening into the passage adjacent and downstream of the restriction where a suction is created in the duct by which the molten solder is sucked into the passage and blown therealong by the gas stream and connecting means for connecting the attachment to the soldering tool.

References Cited

UNITED STATES PATENTS

| | | | |
|---|---|---|---|
| 2,609,778 | 9/1952 | Bleam et al. | 228—20 |
| 3,169,499 | 2/1965 | Armanno | 228—20 |

RICHARD H. EANES, JR., *Primary Examiner.*

CHARLIE T. MOON, *Examiner.*

M. L. FAIGUS, *Assistant Examiner.*